United States Patent

[11] 3,545,582

| [72] | Inventor | Edward Kimmen<br>Pointe Shores, Michigan |
|---|---|---|
| [21] | Appl. No. | 759,453 |
| [22] | Filed | Sept. 12, 1968 |
| [45] | Patented | Dec. 8, 1970 |
| [73] | Assignee | Stilson Corporation<br>Roseville, Michigan |

[54] CONVEYOR CUSHION ROLLER
7 Claims, 8 Drawing Figs.

[52] U.S. Cl................................................. 193/37,
29/121, 74/230.7
[51] Int. Cl...................................................... B21b 27/02,
27/02, B65g 13/00, F16h 55/48
[50] Field of Search............................................ 193/37;
198/127, 230; 29/121(A), 121(H), (Machlin);
15/230.16; 74/229, 230(5,6,7), 230

[56] References Cited
UNITED STATES PATENTS
| 685,680 | 10/1901 | Galloway...................... | 74/230.5 |
| 2,631,618 | 3/1953 | Arvidson...................... | 29/121(A)UX |
| 2,651,398 | 9/1953 | McGraw....................... | 193/37 |
| 2,632,901 | 3/1953 | Markusen..................... | 29/121(A)UX |

Primary Examiner—Edward A. Sroka
Attorney—Cullen, Sloman & Cantor

ABSTRACT: A self-cleaning rubberlike, conveyor cushion roller having a central mounting hole extending therethrough and an integral, narrow hub formed on each end surrounding the hole, and integral, diametrically extending fins also formed on the ends, with the exposed faces of the hub and fins being coplanar for abutting against another identical roller and forming a substantial gap between adjacent rollers. The peripheral surface of the rollers may be configured to scrub and better cling to a workpiece rested upon and conveyed by the roller.

PATENTED DEC 8 1970 3,545,582

INVENTOR
EDWARD KIMMEN

BY Cullen, Sloman, & Cantor

ATTORNEYS

PATENTED DEC 8 1970

INVENTOR
EDWARD KIMMEN

BY Cullen, Sloman, & Cantor

ATTORNEYS

CONVEYOR CUSHION ROLLER

BACKGROUND OF INVENTION

This invention relates to improvements in corrugated conveyor cushion rollers of the type disclosed in the U.S. Pat. to McGraw, U.S. Pat. No. 2,651,398 issued Sept. 8, 1953. Such type rollers are conventionally made of a soft, resilient rubberlike material such as Neoprene or natural rubbers and are provided with deep peripheral grooves to form flexible fins. A workpiece conveyed upon the roller tends to bend and flex the fins which in turn, in rubbing and moving against the workpiece tends to clean the workpiece to some extent.

In addition, the movement of the fins, plus the deep grooves, act to self-clean these rollers by moving accumulated dirt off their outer peripheral edges so as to avoid scratching or damaging the workpiece.

Frequently such type rollers are used in groups, that is, a number of such rollers arranged end to end to support a wide workpiece being conveyed from one location to the other. In that situation, dirt, bits of metal and other foreign materials have a tendency to accumulate between the ends of adjacent rollers and at times, cause damage to the workpiece.

In addition, although these rollers tend to cling to the workpiece to some limited extent, where the workpiece is being conveyed up a sharp angle, such rollers are inadequate to properly grip and move the workpiece.

SUMMARY OF INVENTION

An object of this invention is to form such type of corrugated conveyor cushion rollers with a means at the ends thereof so that a gap is produced between adjacent abutting rollers, and with the material defining the gap flexing and deforming as the roller carries the workpiece so as to remove accumulated foreign material from between adjacent rollers.

Another object of this invention is to provide the peripheral surface of such rollers with a suitable configuration for better scrubbing or rubbing the supported surface of the workpiece to remove foreign material therefrom and in addition to better cling to the workpiece surface so as to move the workpiece along inclines.

Summarizing, the invention herein contemplates forming an integral annular hub on the opposite ends of the roller and integral, diametrically arranged fins which together abut similar hubs and fins on adjacent rollers so as to form a flexible gap between adjacent rollers for dirt removal. In addition, this invention contemplates forming the outer periphery of the roller either in a zig-zag fin pattern or in a fin pattern including suction cup forming depressions, which patterns tend to scrub the workpiece surface as well as better cling to it for moving the workpiece up and down inclines.

Further objects and advantages of this invention will become apparent upon reading the following description, of which the attached drawings form a part.

DETAILED DESCRIPTION

Figure 1:
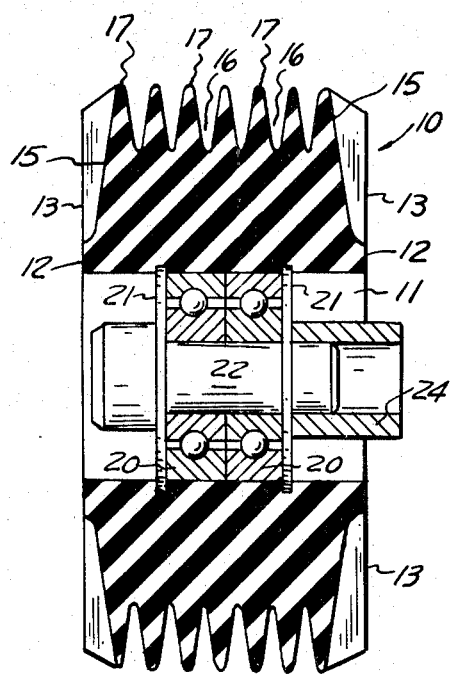
FIG. 1 is a cross-sectional elevational view of the improved roller hereof, shown mounted upon a support shaft.
Figure 2:
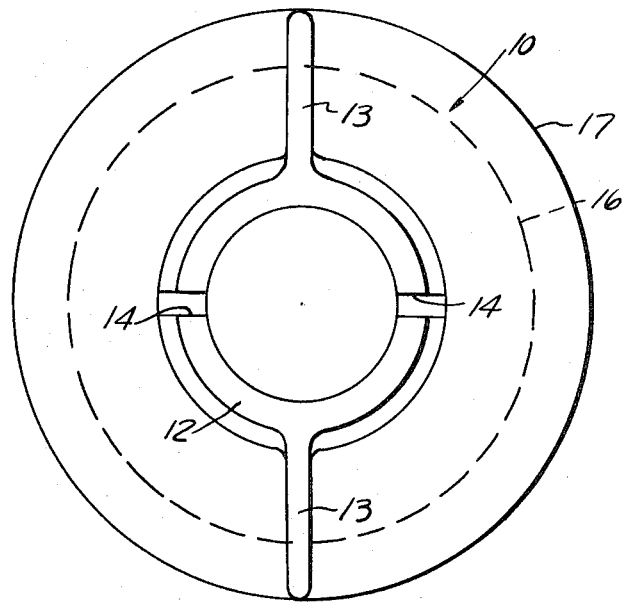
FIG. 2 is a front elevational view of the roller, per se.

FIGS. 1 to 4 illustrate a conveyor cushion roller 10 formed in a cylindrical shape out of a relatively soft, resilient rubberlike material, such as natural rubber or a suitable synthetic rubber, such as Neoprene or the like. The roller is provided with a central mounting hole 11.

An integral, narrow, annular hub 12 is formed on the opposite ends of the roller, surrounding the hole and extending radially outwardly from the hubs are a pair of diametrically aligned narrow fins 13. The exposed faces of the fins and the hub, on each side of the roller, are flat and arranged coplanar.

Each hub is additionally provided with an opposed pair of grooves 14 which are offset 90° relative to the fins.

The opposite ends of the roller, exclusive of the hubs and fins are arranged in sloping or angled end faces 15. The outer peripheral surface of the roller is provided with deep grooves 16 which define between them narrow, elongated resilient fins 17 which flex and bend when contacting and supporting a workpiece.

The roller may be mounted upon suitable support shafts such as illustrated for example in FIG. 1 and comprising a pair of roller bearings 20 held by washers 21 upon a shaft 22 having a head 23 and an opposite end secured to a connector sleeve 24 for connection to another similar shaft. Alternatively, the roller may be mounted upon a sleeve (not illustrated) which in turn is carried by a support shaft, as is conventional.

Figure 4:
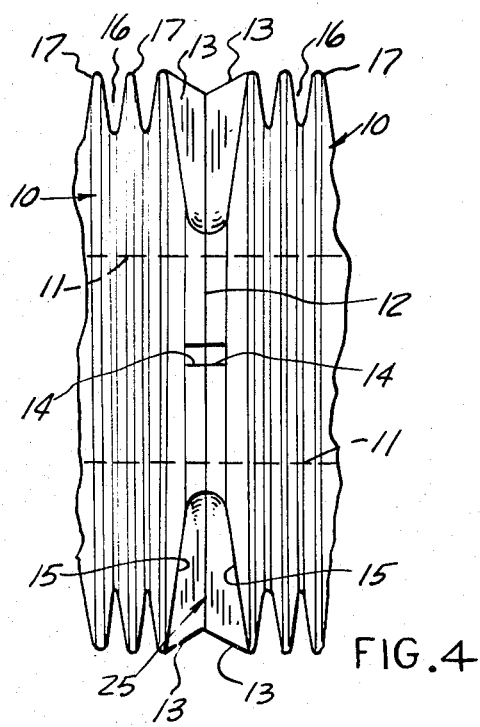
FIG. 4 is a fragmentary view of two rollers abutted end to end.
Figure 3:
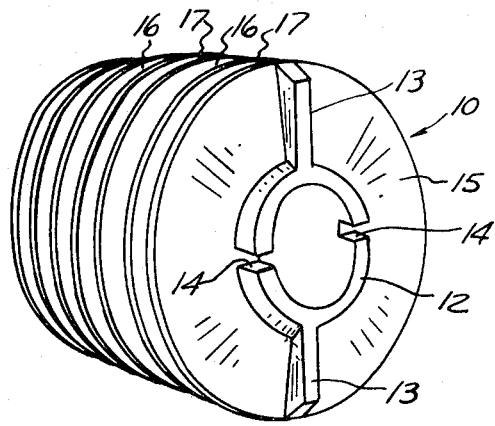
FIG. 3 is a perspective view of the roller.

When two or more rollers are mounted end to end, as illustrated in FIG. 4, their adjacent hubs and fins abut to form a gap 25 between their respective ends 15. The gap is defined by the sloping end walls and the flexing of the roller tends to flex the wall defining the gap to thereby move and loosen and remove any dirt or foreign materials accumulating between the ends of the rollers.

MODIFICATION FIGURE 5

Figure 5:
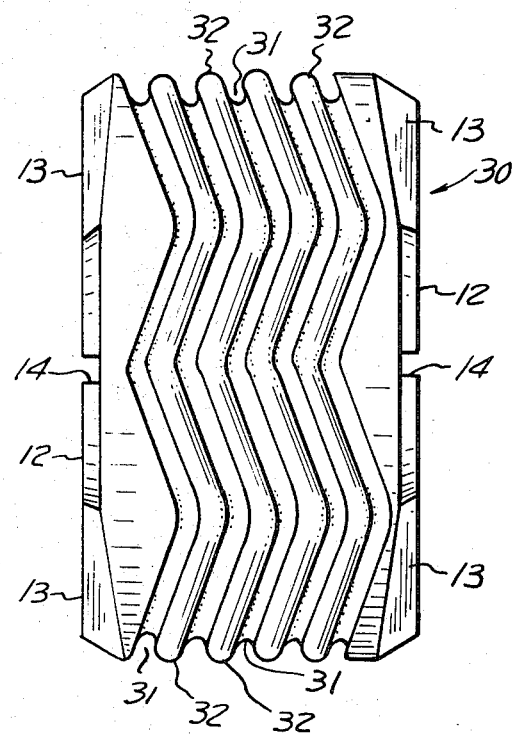
FIG. 5 illustrates a modification wherein the fins are arranged in a zig-zag pattern.

FIG. 5 illustrates a modified roller 30, similar to that described above, with the exception that the peripheral grooves 31 are formed in a zig-zag pattern, that is extending first towards one end and then reversing to similarly extend toward the opposite end of the roller so that the fins 32 are zigzag in arrangement. This formation tends to scrub and better grip the supported workpieces to remove dirt therefrom and to help move it up slight inclines.

MODIFICATION—FIGURES 6 & 7

Figure 6:
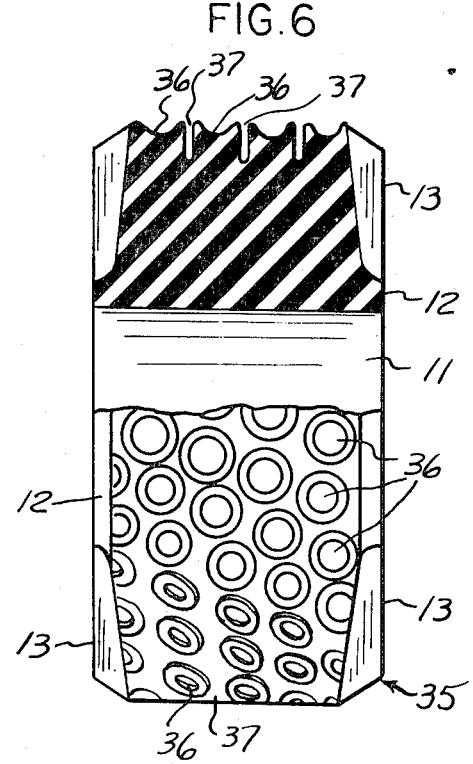
FIG. 6 is a further modification wherein suction cup depressions are formed in the outer periphery of the roller.

FIG. 6 illustrates a modified roller 35 wherein the outer periphery is patterned to even better grip the workpiece for movement up sharp inclines. Thus, the peripheral surface of the roller is provided with suction cuplike depressions 36, closely spaced together, with deep grooves 36 between them so that in effect they form fins which are suction cup patterned.

Figure 7:
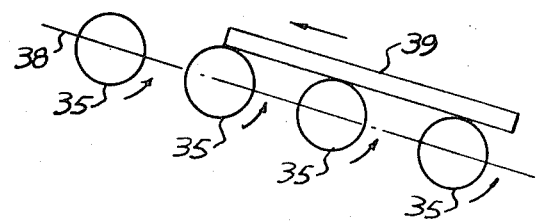
FIG. 7 is a schematic view illustrating the movement of a workpiece up an incline utilizing the roller of FIG. 6.

As illustrated in FIG. 7, this type of roller could be arranged upon a sharply inclined or sloping axis 38 to grip and move a workpiece 39. The suction cup pattern not only better grips a workpiece, but provides numerous edges for flexing and scrubbing against the workpiece and thereby helping to clean it of foreign material.

MODIFICATION—FIGURE 8

Figure 8:
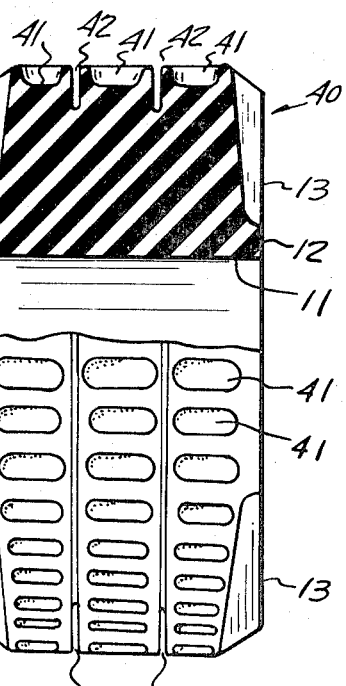
FIG. 8 is a further modification showing elongated suction cup depressions.

FIG. 8 is a further modification, similar to that of FIG. 6. Here, the roller 40 is provided with a pattern of elongated suction cuplike depressions 41, with the rows of such depressions separated by deep grooves 42. As in the case of FIG. 6, this pattern tends to better grip and scrub workpieces rested upon the rollers and moved by such rollers.

This invention may be further developed within the scope of the following claims. Accordingly, it is desired that the foregoing description be read as being merely illustrative of an operative embodiment of this invention, and not in a strictly limited sense.

I claim:

1. In a cylindrically shaped, conveyor cushion roller formed of relatively soft, resilient rubberlike material and having an axially central mounting hole extending therethrough, the diameter of the roller being considerably greater than the diameter of the hole, the improvement comprising:

each of the opposite ends of the roller having an integral, narrow, continuous annular hub surrounding and forming an extension of the peripheral edge defining said hole and extending axially of the roller a short distance and terminating in a flat, annular shaped face with the diameter of the roller being roughly two times the diameter of the hub; and with a pair of diametrically aligned side fins formed integral with each of the roller ends, each fin extending radially from and integral with the outer peripheral surface of its respective hub to the outer periphery of the roller, and the free edges of the fins being flat and coplanar with the hub annular face and spaced from the adjacent end faces of the roller.

2. An article as defined in claim 1, and the outer peripheral surface of the roller being formed with deep, closely spaced grooves to define resilient, closely spaced, radially outwardly extending narrow peripheral fins.

3. An article as defined in claim 2, and substantially the entire outer peripheral surfaces of the grooves being formed with numerous, closely spaced, cuplike depressions to form a vacuum-type gripping surface and numerous scrubbing edges for scrubbing the surface of a workpiece.

4. An article as defined in claim 2, and said grooves being parallel and zig-zagging relative to the axis of the roller, that is, successively extending at an angle relative to the roller axis towards one end of the roller and then reversing and similarly extending towards the opposite end of the roller, wherein the fins formed by the grooves tend to scrub a workpiece rested upon and conveyed by the roller.

5. In a cylindrically shaped, conveyor cushion roller formed of relatively soft, resilient rubberlike material and having an axially central mounting hole extending therethrough, the improvement comprising:

each of the opposite ends of the roller having an integral, narrow, continuous annular hub surrounding and forming an extension of the peripheral edge defining said hole and extending axially of the roller a short distance and terminating in a flat, annular shaped face;

with a pair of diametrically aligned side fins formed integral with each of the roller ends, each fin extending radially from and integral with the outer peripheral surface of its respective hub to the outer periphery of the roller, and the free edges of the fins being flat and coplanar with the hub annular face; and a second roller identical to the first mentioned roller, with the two rollers arranged end to end and axially aligned, and with their adjacent flat annular hub faces and fin free edges being aligned and abutting in face to face contact to otherwise form a gap between their adjacent ends.

6. An article as defined in claim 5, and the opposite ends of the rollers, excluding their fins and hubs, being sloped, so that the gap between two adjacent rollers widens from the hub towards the peripheral surface of the rollers.

7. In a cylindrically shaped, conveyor cushion roller formed of relatively soft, resilient rubberlike material and having an axially central mounting hole extending therethrough, the improvement comprising:

each of the opposite ends of the roller having an integral, narrow, continuous annular hub surrounding and forming an extension of the peripheral edge defining said hole and extending axially of the roller a short distance and terminating in a flat, annular shaped face;

1 with a pair of diametrically aligned side fins formed integral with each of the roller ends, each fin extending radially from and integral with the outer peripheral surface of its respective hub to the outer periphery of the roller, and the free edges of the fins being flat and coplanar with the hub annular face;

a pair of diametrically aligned, radially extending grooves, formed in the faces of each of the hubs and opening into both the inner and outer peripheral edges defining the hub; and the grooves being approximately 90° offset from the fins.